No. 865,314. PATENTED SEPT. 3, 1907.
H. P. OSBORN.
METHOD OF PRODUCING THREADS AND UNDERCUTS IN PORCELAIN
AND OTHER VITREOUS SUBSTANCES.
APPLICATION FILED MAY 6, 1905.
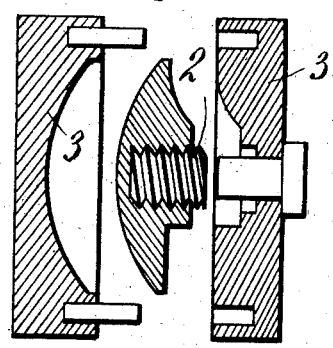
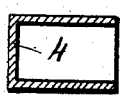
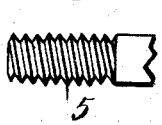
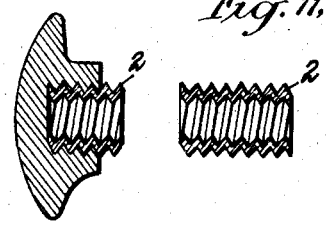
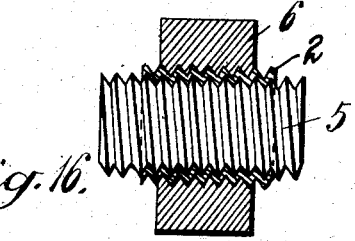
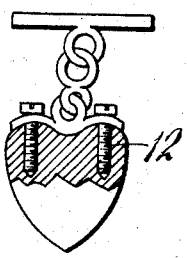
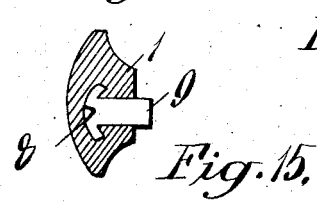
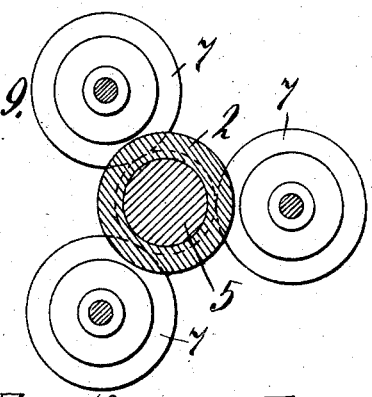
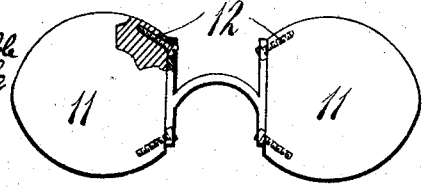
WITNESSES:
INVENTOR

UNITED STATES PATENT OFFICE.

HENRY P. OSBORN, OF BAYONNE, NEW JERSEY.

METHOD OF PRODUCING THREADS AND UNDERCUTS IN PORCELAIN AND OTHER VITREOUS SUBSTANCES.

No. 865,314.　　　　　　　　Specification of Letters Patent.　　　　　　Patented Sept. 3, 1907.

Original application filed May 9, 1904, Serial No. 207,104. Divided and this application filed May 6, 1905. Serial No. 259,103.

*To all whom it may concern:*

Be it known that I, HENRY PORTER OSBORN, a citizen of the United States, residing at Bayonne, in the county of Hudson and State of New Jersey, have invented a new and useful Method of Producing Threads and Undercuts in Porcelain and other Vitreous Substances, of which the following is a specification.

This invention relates to a method of producing accurate screw threads and other undercuts in vitreous substances, such as porcelain and glass, which are too hard to be cut readily with a metallic screw tap; and the object of my invention is to produce in such materials an accurate screw thread or like undercut, which may be as fine as desired, which shall have a smooth finished surface, and the making of which shall not involve tearing the surfaces of the vitreous material or rendering them rough or jagged; and to make the method of producing such articles, simple, easily carried out, and not unduly expensive.

In the accompanying drawings I illustrate certain articles having screw threads or other undercuts made according to my process, also apparatus convenient for use in carrying out the method.

In said drawings: Figure 1 shows a vertical section through a tooth mold such as may be used in carrying out my invention, the parts of the mold being separated, and also shows a vertical section of tooth as molded therein, with a thread-forming bushing embedded in such tooth. Fig. 2 shows a vertical section through the completed screw-threaded tooth. Fig. 3 shows an outside view of a threaded metallic bushing such as may be used in forming the thread in such tooth, and Fig. 4 shows a longitudinal section through such bushing. Fig. 5 shows a section through a plane-surfaced cup such as may be made preparatory to forming screw threads therein; Fig. 6 shows the same cup as threaded for the formation of screw threads; and Fig. 7 shows a mandrel for forming the threads in such cup; Fig. 8 shows a die adapted to coöperate with such mandrel in forming screw-threads in such a cup, and Fig. 9 shows alternative apparatus for the same purpose. Fig. 10 shows a vertical section of a porcelain tooth with such a hollow threaded core baked therein; the core being one such as may be formed by apparatus such as shown in Figs. 7, 8 and 9, and Fig. 11 shows a longitudinal section of the same core by itself. Fig. 12 shows a vertical section of a tooth with a matrix for forming another type of undercut embedded therein; Fig. 13 shows a detail elevation of such matrix, and Fig. 14 shows a spring hook such as may be anchored in the undercut cavity formed by the matrix of Fig. 13. Fig. 15 illustrates a section through eye glasses the lenses of which have screw-threaded holes formed therein as may be done by my process. Fig. 16 shows an elevation and partial section of a jewelry pendant having similar orifices.

Particularly in dentistry but also in certain other arts, it is extremely desirable to provide vitreous articles, such as porcelain teeth and tooth-faces, with fine accurate screw threads or other undercut cavities. This has proved in the past to be a substantial impossibility, as it is not practicable to withdraw a suitable core or like object for forming such cavities, from the molded raw material of the tooth or other article, prior to firing, and it is substantially impossible to withdraw such core or like article after firing; moreover, if the core could be withdrawn from the molded raw material before firing, the surface of such material adjacent to the core would be more or less torn or displaced, and even if this could be avoided, the distortion of the article during firing would render the threads inaccurate. I avoid these troubles and difficulties by forming the threaded or other undercut cavity by means of a soluble core of material capable of resisting the temperature at which the vitreous material is baked or molded, the molding being so conducted that the core is properly embedded in the molded article; after which if the material molded be raw porcelain or like plastic, it is baked in the usual manner, with the core still in place therein. If the material molded be glass or like material molded from a liquid state, this baking is not necessary, though the annealing to which molded glass articles are ordinarily subjected will customarily follow the molding. I then dissolve out the said core by means of a reagent which attacks the material of said core without attacking at all, or to any appreciable or material degree, the vitreous material around said core. The core being thus entirely removed without any mechanical movement of its surface against or upon the adjacent surface of the vitreous material within which it was molded, such surface of the vitreous material is left perfectly true and smooth. It will be observed that since the core is removed after baking or annealing, the undercut surfaces formed are not even distorted by the customary changes of shape or size which vitreous materials frequently undergo during baking or annealing; for the core is a material which even at the temperature of such baking or annealing retains sufficient strength and body to prevent it and the surfaces around it from being materially or noticeably distorted.

In stating that the core is of soluble material I do not mean to imply that it is of material soluble in water. Ordinarily such core will be of metal, such, for example, as platinum or its alloys, nickel, vanadium or tungsten; but I may use graphite, prepared carbon or a silicious material. In the case of metals the solvent will ordinarily be an acid. If the material be so costly as to be worth recovering from the acid solution this can be done readily by methods well known, so that there is practically no loss of material.

Referring now to the accompanying drawings and at first to Figs. 1—4 thereof, 1, Fig. 2, shows a completed porcelain tooth having therein a screw threaded cavity such as may be formed therein by the method herein described; and 2, Figs. 3 and 4, shows the metallic screw threaded core by which the screw threaded undercut in said tooth is molded. This core is preferably hollow as indicated in the sectional view, Fig. 4, in order to give the solvent used to remove said core, as large surface for action as possible, so facilitating as much as possible the removal of said core.

Fig. 1 shows the molds 3, 3, for forming the porcelain tooth, and also shows a tooth as molded therein with the core 2 still in place.

Instead of using a core with cut or cast threads as shown in Figs. 3 and 4, I may employ one with rolled or pressed threads as shown in Fig. 6, such core being conveniently formed from a hollow cup 4 such as shown in Fig. 5, by inserting therein a mandrel 5, such as shown in Fig. 7 and rolling or pressing said cup from the outside into and around the threads of said mandrel. Rolling or spinning apparatus such as shown in Figs. 8 and 9 may be used in connection with such mandrel 5 for so pressing in the walls of the cup. In Fig. 8 there is a threaded die 6 arranged to press the hollow tube 2 into the threads of said mandrel, and also to perfect threads on the outside of said tube. In Fig. 9 instead of the die I show rotary disks 7 which serve the same purpose.

It sometimes happens that artificial teeth or tooth faces or crowns are designed to be held in place, not by screws, but by anchors. Fig. 12 shows such an artificial tooth, the cavity 8 to be formed therein being of approximately anchor shape. In such case an anchor shaped core 9, such as shown within the said tooth 1 and also shown just to the right of said tooth, may be used, said core being embedded within the vitreous material during the molding as above described, and then subsequently dissolved out. Fig. 14 shows a form of spring hook 10 adapted to be used in connection with such a tooth in securing same in place.

One important application of my invention is the formation in the lenses of eye glasses of screw threaded cavities for securing such lenses to the eye glass frame. Fig. 15 shows eye glasses having lenses 11 provided with screw threaded recesses formed as above described, receiving screws 12 by which the eye glass frame is secured to said lenses. Still another useful application of my invention is in the attachment of vitreous articles of jewelry or the like. Fig. 13 shows a jewelry pendant having like screw threaded recesses receiving screws 12.

What I claim is:—

1. A process of forming reëntrant or undercut cavities in vitreous material, which consists in molding into such material a soluble core of heat resisting material corresponding in shape to the desired undercut shape, baking the material with the core in place and retaining such core in full contact with the walls of said undercut shape during the entire baking operation, and after said material has become hard, dissolving out said core by means of a solvent.

2. A process of forming reëntrant or undercut cavities in vitrified plastic material, which consists in molding into such material, while plastic, a soluble core of heat resisting material corresponding in shape to the desired undercut shape, baking such molded material with the core in place therein and retaining the core in full contact with the walls of said undercut shape during the entire baking operation, and then dissolving out said core by means of a solvent.

3. A process of forming screw-threaded cavities in vitrified plastic material, which consists in molding into such material, while plastic, a screw-threaded core of soluble heat-resisting material, baking such molded article with the core in place therein, and then dissolving out said core by means of a solvent.

4. A process of forming reëntrant or undercut cavities in vitreous material, which consists in molding into such material a hollow soluble core of heat resisting material corresponding in shape to the desired undercut shape, and after the material has become hard, applying a liquid solvent to the interior of said core and so dissolving the core.

HENRY P. OSBORN.

Witnesses:
H. M. SURRIDGE,
A. M. MODE.